United States Patent [19]

Brenner

[11] 4,140,060

[45] Feb. 20, 1979

[54] SUBCARRIER MODULATED OPTICAL TRANSCEIVER

[75] Inventor: Charles H. Brenner, Scottsdale, Ariz.

[73] Assignee: Motorola, Inc., Schaumburg, Ill.

[21] Appl. No.: 578,554

[22] Filed: May 19, 1975

[51] Int. Cl.² ............................ F42B 5/08; F42B 9/08
[52] U.S. Cl. .................................. 102/214; 343/7 PF;
343/18 E; 356/5; 356/28; 102/215
[58] Field of Search .................. 356/28, 4, 5, 201, 204,
356/103, 104; 343/7 A, 7 PF, 18 E; 102/70.2 P

[56] References Cited

U.S. PATENT DOCUMENTS

| 3,508,828 | 4/1970 | Froome et al. ......................... 356/5 |
| 3,519,354 | 7/1970 | Brown, Jr. et al. ................... 356/103 |
| 3,709,599 | 1/1973 | Iten ....................................... 356/103 |
| 3,719,942 | 3/1973 | Herman ............................... 343/7 A |
| 3,745,573 | 7/1973 | Dick .................................... 343/7 PF |
| 3,906,493 | 9/1975 | Adrian et al. .................... 102/70.2 P |

Primary Examiner—S. C. Buczinski
Attorney, Agent, or Firm—Michael D. Bingham

[57] ABSTRACT

A coherent optical modulated sensor for use with missiles and the like wherein a series of pulses of optical energy which are intensity modulated by a radio frequency sub-carrier are transmitted to a preselected target having relative motion thereto and wherein returned pulses from the target are received. Phase coherence is effectively maintained by utilizing a single continuously operating local oscillator for down-converting the received detected pulses to a Doppler frequency signal. Target velocity information may be extracted from the Doppler frequency shift induced on the coherent radio frequency sub-carrier of the return pulses.

A first channel, or radio frequency sub-carrier channel is provided for receiving the Doppler signal and generating a threshold signal in response to the magnitude of the Doppler signal being equal to or greater than a predetermined magnitude. A second channel (baseband) detects the average direct current power of the received pulse. The average direct current power is compared to the threshold signal for providing a firing control signal when the magnitude of the threshold signal is greater than the magnitude of the detected average current power. The coherent optical modulated sensor may thus be used for detecting preselected targets while discriminating against pulse returns from aerosols.

14 Claims, 6 Drawing Figures

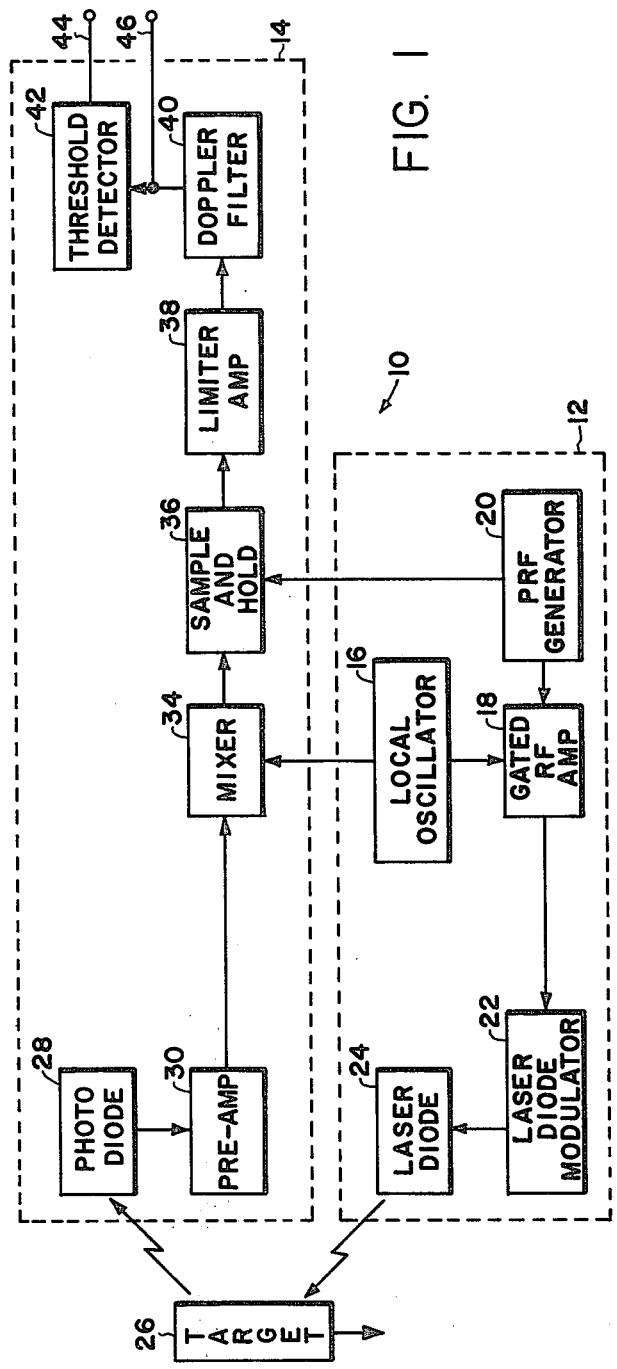
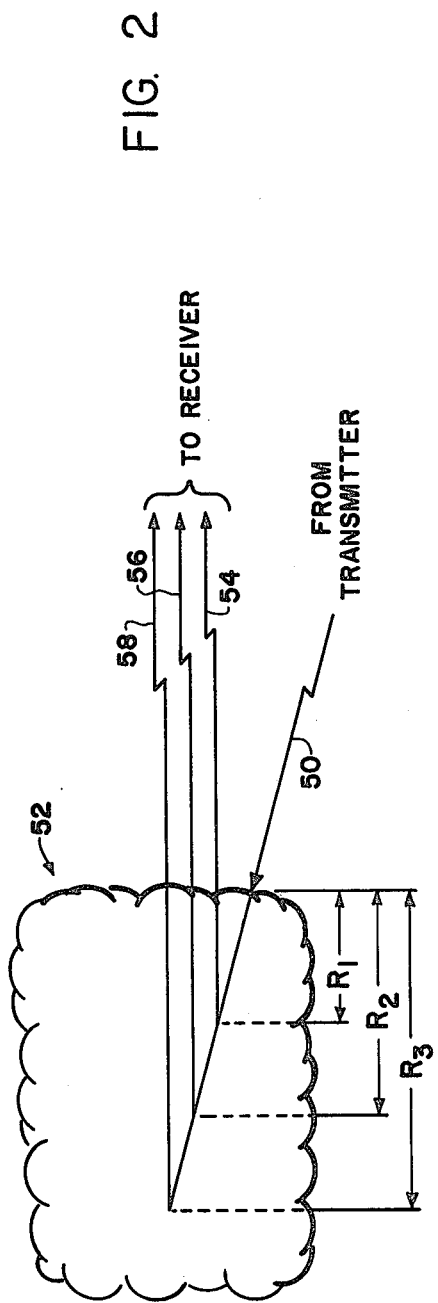
FIG. 1
FIG. 2

SUBCARRIER MODULATED OPTICAL TRANSCEIVER

BACKGROUND OF THE INVENTION

This invention relates in general to transceiver apparatus and more particularly, to an improved coherent modulated optical sensor adaptable for use within a missile or bomb fuze, and wherein a comparison between sub-carrier and baseband detection channels may be employed for determining whether a target is real or an aerosol, thereby preventing the optical sensor from prefunctioning due to the aerosol.

Optical sensors of the type which are adapted for inclusion within a tracking system are well known in the art. However, prior art optical sensors do not modulate the intensity of the optical energy generated thereby. Hence, these systems measure only the range of a target by video detecting the return pulses from the target. Furthermore, these systems cannot readily discriminate against pulses which might be returned from an aerosol and pulses which might be returned from a dull target. Therefore, in some prior art optical sensors, a threshold signal might be obtained from an aerosol which could cause the missile or bomb fuze to prefunction.

Conventional radio frequency (RF) Doppler radar systems suffer from the disadvantage of being readily susceptible to electronic counter measures. However, because the field of view of the optical sensor of the invention is much narrower than that of conventional RF radar systems, electronic counter measure against such a system is much more difficult.

Accordingly, it is an object of the present invention to provide an improved optical sensor in which target velocity information can be obtained from a predetermined target having relative motion thereto.

Another object of the present invention is to provide an improved optical sensor for use in a missile or free fall munition fuze system which has aerosol rejection capabilities.

Still another object of the present invention is to provide an improved optical sensor for use within a missile or bomb fuze system wherein the optical energy transmitted is a series of pulses which are intensity modulated by a radio frequency sub-carrier signal.

Yet another object of the present invention is to provide an improved coherent modulated sensor of the foregoing type wherein the received pulses are phase coherent with the transmitted pulses.

A further object of the present invention is to provide an improved coherent modulated sensor of the foregoing type wherein the transmitting of pulses of intensity modulated optical energy and the down converting of the received pulse information is effected by a radio frequency reference signal.

A still further object of the present invention is to provide an improved coherent modulated sensor of the foregoing type wherein the receiver portion thereof includes a radio frequency sub-carrier channel and a baseband channel for comparison of the magnitude of the Doppler signal to the average direct current power comprising the received pulses to provide for aerosol rejection.

SUMMARY OF THE PRESENT INVENTION

The coherent modulated optical sensor circuit configuration and method of sensing of the invention are suitable for providing target velocity information which may be extracted from the Doppler frequency shift induced on a coherent frequency (RF) sub-carrier.

Moreover, the coherent modulated optical sensor of one embodiment of the invention provides a constant false alarm receiver for aerosol rejection. The coherent modulated optical sensor circuit includes a transmitter and receiver circuit. The transmitter circuit generates intensity modulated optical pulses on an RF sub-carrier signal. The receiver circuit receives the return intensity modulated pulses from the target and extracts target velocity information from the Doppler frequency shift induced on the RF sub-carrier channel with the RF subcarrier signal being phase coherent with the transmitted signal. The receiver circuit of the coherent modulated optical sensor includes an RF sub-carrier channel for detecting the returned optical flux from the target and amplifying the detected signal and heterodyning it against a sub-carrier reference signal. The RF sub-carrier channel further includes a detecting circuit for providing RF sub-carrier signal information. A second, or, baseband video channel, may be included in the receiver for providing a baseband video signal which is compared to the signal information from the RF sub-carrier channel. Therefore, the coherent modulated optical sensor circuit of the invention is not deleteriously affected by aerosols or the like.

BRIEF DESCRIPTION OF THE DRAWING

FIG. 1 is a block diagram of a coherent modulated optical sensor of one embodiment of the invention;

FIG. 2 is a diagram useful for explaining problems generated by aerosols which are solved by the preferred embodiment of the invention;

FIG. 5 is a block diagram of a coherent modulated optical sensor of the preferred embodiment of the invention.

DETAILED DESCRIPTION OF THE PREFERRED EMBODIMENT

Figure 3:
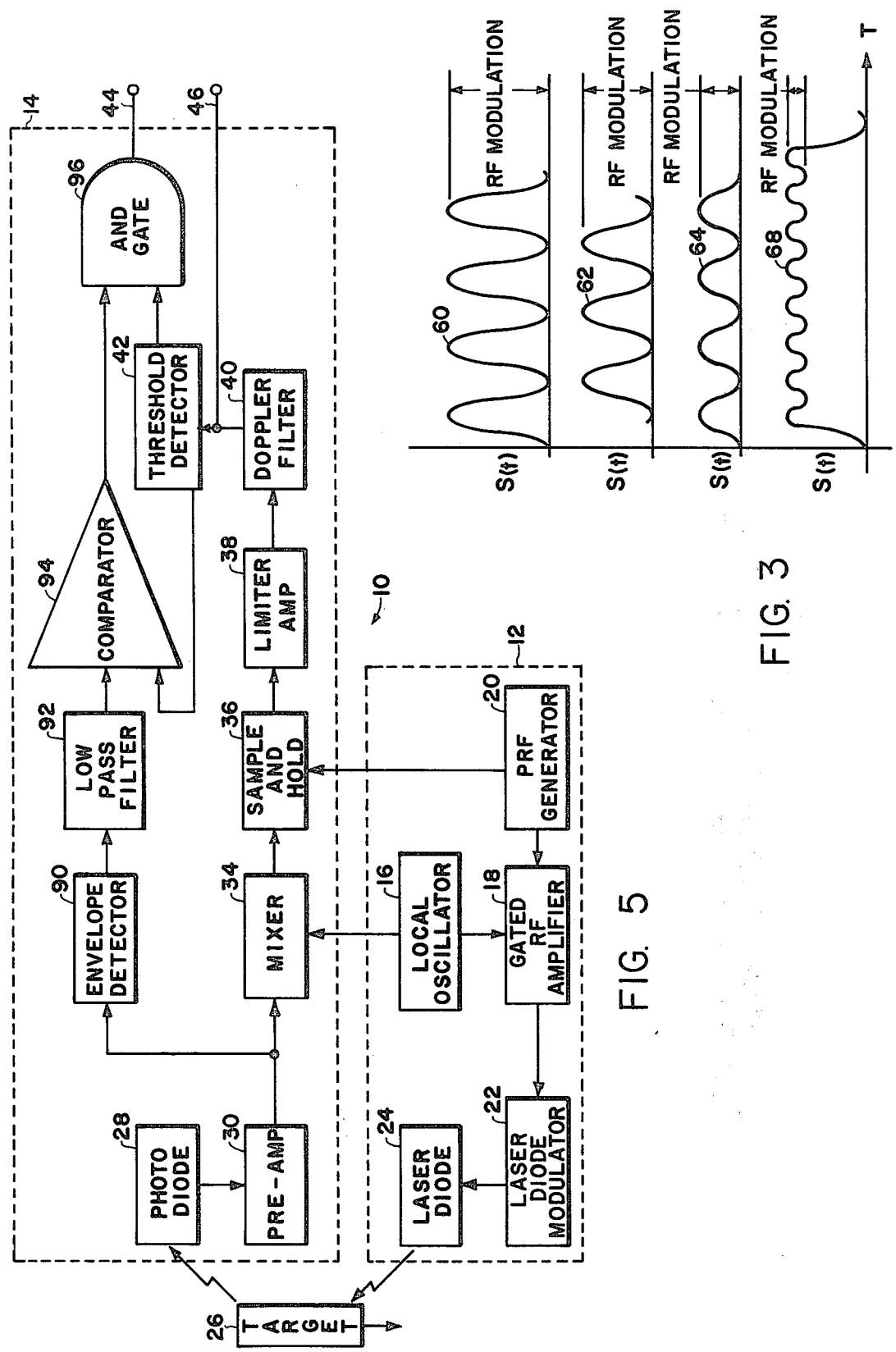
FIG. 3 shows waveforms useful for understanding the phenomenon of FIG. 2.

The coherent modulated optical sensor shown in block diagram form in FIG. 1 and FIG. 5 is comprised of typical solid state circuits throughout that are well known to those skilled in the art and therefore, need not be shown or described in great detail.

Referring to FIG. 1, there is shown coherent modulator optical sensor 10 which is comprised of transmitter 12 and receiver 14.

Transmitter 12 is illustrated as including local oscillator 16 which generates a radio frequency (RF) reference signal at a predetermined frequency. The RF reference signal from local oscillator 16 is applied to gated RF amplifier 18 which also receives a control signal from pulse repetition frequency generator 20. The output of gated RF amplifier 18 is a series of pulses at the predetermined frequency of the reference signal from local oscillator 16 which are applied to laser diode modulator 22. Laser diode modulator 22 is adapted to modulate laser diode 24, which includes a gallium arsenide diode. Laser diode 24 is modulated by laser diode modulator 22 in such a manner that pulses of optical energy are emitted therefrom which are intensity modulated by the RF sub-carrier signal from gated RF amplifier 18. The generated pulses from laser diode 24 are then transmitted through an optical lens (not shown) which has the same function as an antenna in a conventional RF radar system. The transmitted sequence of pulses are utilized to detect a preselected target which has relative motion with respect to coherent modulated optical sensor 10.

Receiver 14 of coherent modulated optical sensor 10 is shown as including photodiode 28 which is tuned to the RF sub-carrier frequency and detects the optical flux return from target 26. The detected return is then amplified by preamplifier 30. The amplified detected return signal information is then applied to one input terminal of mixer 34 which has a second input terminal connected to local oscillator 16. Thus, the detected return signal information is heterodyned against the RF sub-carrier reference signal from local oscillator 16. The output of mixer 34 is applied to a constant false alarm receiver which includes sample and hold circuit 36, limiter amplifier 38, and Doppler filter 40. For example, the constant false alarm receiver may be a standard "Dickey-fix" receiver as is known in the art.

The output of Doppler filter 40 is then applied to threshold detector 42 for providing a threshold signal at output terminal 44 thereof. Target velocity information can be determined from the Doppler frequency output signal applied at terminal 46.

In operation, light energy output from laser diode 24 is intensity modulated by the reference signal from local oscillator 16 which results in generation and transmission of a sequence of pulses of light on a RF sub-carrier frequency at a particular pulse repetition frequency (PRF) as generated by PRF generator 20. The generated pulses are then transmitted through a lens (not shown) as is understood in the art.

The returned pulses, from the selected target which has relative motion with respect to sensor 10, are collected through an appropriate lens (also not shown) of receiver 14 onto photodiode 28. Photodiode 28, being tuned to the predetermined RF reference frequency, then detects the optical flux applied thereto. The detected signal is then amplified by preamplifier 30 and applied to mixer 34. The received reply pulse information is down-converted in the presence of the applied reference signal from local oscillator 16 to a Doppler frequency signal.

Phase coherence between a transmitted pulse and the detected RF sub-carrier information applied to mixer 34 is effectively maintained by employing single continuously running local oscillator 16, as is understood in the art. In addition, the shift in frequency between the outgoing and incoming signal information, i.e., Doppler shift, may be utilized to compute the radial velocity or speed of the target in a manner also understood in the art. More properly, it is the rate of change of the phase of the RF sub-carrier of the received reply pulse information with respect to that of the transmitted pulses that contains the Doppler velocity information.

The pulse signal information from mixer 34 is then applied to sample and hold circuit 36. With pulse width and repetition period of some given, but fixed parameters being applied to sample and hold circuit 36 from PRF generator 20, the output of sample and hold circuit 36 is essentially a sinusoid envelope of the Doppler signal information signal. With no output signal from sample and hold circuit 36, the output of limiter amplifier 38 is comprised of noise, as is known in the art. The bandwidth response of limiter amplifier 38 is set at substantially (PRF)/2. In the presence of Doppler signal information, limiter amplifier 38 provides an output signal which is proportional to the signal-to-noise ratio of the Doppler signal information. The output of limiter amplifier 38 drives Doppler filter 40 which generates an output signal having a magnitude related to the signal-to-noise ratio of the detected Dopper signal. For illustration, the combination of sample and hold circuit 36, limiter-amplifier 38 and Doppler filter 40 forms a "Dickie-fix" constant false alarm receiver which is well known in the art. The output of Doppler filter 40 being equal to or greater than a predetermined value, is then applied to threshold detector 42 which provides a threshold signal. For example, if the coherent modulated optical sensor were used in a missile or bomb fuze, the threshold signal from threshold detector 42 could be used for activating the firing mechanism thereof.

One significant improvement provided by the embodiment of FIG. 1 over the prior art is the velocity information is available from the output signal at the output of a Doppler filter. Known optical sensors either transmit continuous wave (CW) modulated optical energy or noncoherent pulse energy. Thus, it is not possible to obtain Doppler information from these systems. Prior art optical sensors determine the range to the target. These systems could possibly provide velocity information by electronically differentiating the measured range information. However, these systems suffer from the disadvantage that unwanted noise signals are introduced into the system due to the differentating step.

The optical sensor of the present embodiment eliminates these problems by utilizing coherent pulse techniques novel to the optical sensor art. Coherent modulating permits target information to be directly discerned from the resultant Doppler information signal and not obtainable in heretofore optical sensors.

The embodiment of FIG. 1 also combines the advantages of conventional optical radar systems with the versatility of coherent pulsed Doppler technique known to those skilled in the art. Thus, the coherent modulated optical sensor described above represents a significant advance in the technology at optical wavelengths where laser diode sources have proven to be reliable and inexpensive.

A significant disadvantage of present optical sensors is their susceptibility to prefunction due to reply pulses being returned from aerosols. When light pulses impinge on an aerosol (for example, a cloud), a back scatter return originates from various depths within the aerosol. Thus, the return pulse will be a time stretched version of the transmitted pulse, as illustrated in FIGS. 2 and 3.

Referring to FIG. 2, as energy (shown as reference numeral 50) from an optical sensor impinges on aerosol 52, energy will be reflected therefrom which will be a composite 59 of waveforms 54, 56, and 58. The amplitude of signals 54, 56, and 58 reflected by aerosol 52 is proportional to the attenuation factor ($\tau$) of the aerosol and the distance (R) that energy 50 penetrates into the aerosol as is understood in the art.

Referring to FIGS. 2 and 3, a brief discussion of the above phenomenon is now given illustrating the pulse stretching effect to signal 50 caused by aerosol 52. A portion of signal information 50, corresponding to wave 54, will be returned from an initial layer of aerosol 52 which is shown as wave form 60 (FIG. 3) having a specified amplified and a phase which is related to $2 \cdot R_1$, the distance that wave 50 penetrates aerosol 52. As illustrated by waveform 62 wave 56 also has a phase which is different from, but related to waveform 60. As signal 50 moves into the aerosol a distance equal to $R_2$ it will be returned (wave 56) with a lower amplitude, and with a phase which is related to $2 \cdot R_2$. Wave form 64, corresponding to wave 58, has an amplitude which is lower yet and a phase which is related to $2 \cdot R_3$ and also to waveforms 60 and 62. Signal 59, returned by aerosol 52, is now made of the composite of signals 54, 56, and 58 and is illustrated by waveform 68. Hence, what is returned by an aerosol is a pulse which "appears" as a DC pulse with very little RF modulation on it. Therefore, an aerosol lessens the intensity of the RF modulation portion of the sequence of intensity modulated light pulses which impinge on it.

Figure 4:
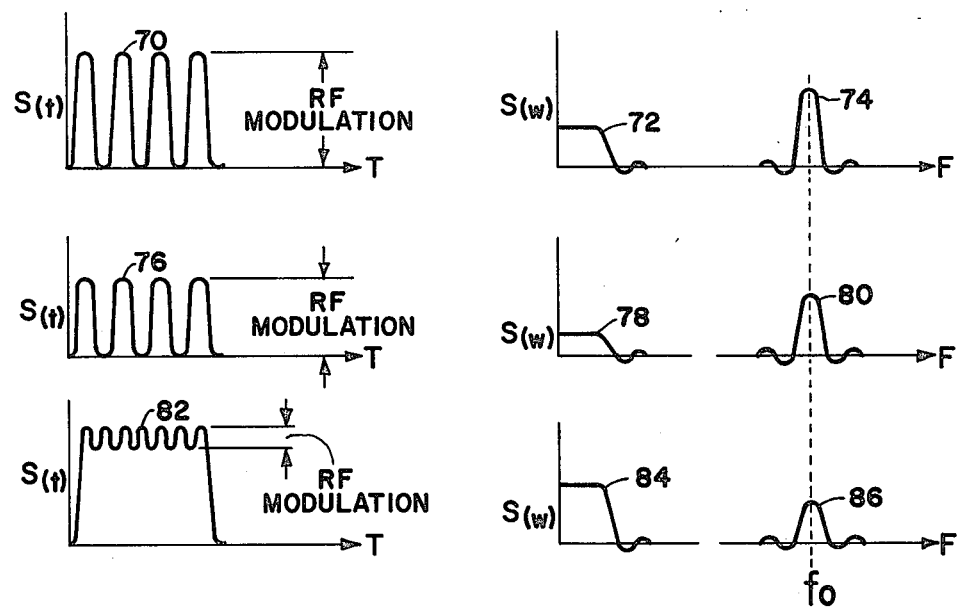
FIG. 4 shows waveforms useful for understanding the operation of the preferred embodiment of FIG. 5.

The aforementioned "stripping" of the RF modulation from the modulated transmitted pulses can cause prefunction of the missile fuze system as will now be explained. Referring now to FIG. 4, there is shown in column A return signal information from a preselected target and in column B there is shown the spectral analysis of the respective return pulse information. Waveform 70 may be a returned pulse from a "hard" target with maximum RF modulation due to the RF sub-carrier signal. The spectrum analysis of waveform 70 is shown in column B of FIG. 4 and includes portion 72 and 74. Portion 72 is proportional to the amount of DC energy contained in wave 70 and portion 74 is proportional to the amount of RF energy at the sub-carrier frequency carrier thereof. As shown, portion 74 has a greater amplitude than waveform portion 72. Waveform portion 76 is illustrated to show the return from a "dull" target. There is still maximum RF modulation; however, the amplitude of waveform 76 will be less with respect to waveform 70. However, waveforms 80 and 78 show that the RF portion is still greater than the DC portion of energy of waveform 76. For the case in which the transmitted pulses from transmitter 12 have been returned by an aerosol there is shown waveform 82 which has very little RF modulation due to the aforedescribed "stripping" by the aerosol. For this case, the DC energy of waveform 82, shown as waveform 84, has a greater amplitude than the RF energy of the sub-carrier frequency as shown by waveform 86. Hence, due to stripping of the RF modulation from the pulse by an aerosol it is possible to obtain DC energy greater in amplitude than the detected RF energy.

In some prior art sensors which function upon only the magnitude of the threshold signal, it is entirely possible to have prefunctioning because of the above described phenomenon. Moreover, if the threshold level is raised sufficient to insure that the RF energy of the detected target must always be greater than the DC portion thereof, it is entirely possible that a real, but dull, target would not be detected. Thus, because of aerosol problems, real targets having dull return signals could not always be detected by prior art sensors. However, the preferred embodiment of FIG. 5 shows a solution to the aforementioned problem. The same reference numbers are used for components corresponding to like components of FIG. 1. The structure of coherent modulated optical sensor 10 of FIG. 5 is quite similar to that of FIG. 1. Wherein optical sensor 10 of FIG. 1 includes a single channel receiver, a second or baseband channel comprising envelope detector 90 and low pass filter 92 is included in optical sensor 10 in FIG. 5. Mixer 34, sample and hold circuit 36, limiter amplifier 38 and Doppler filter 40 comprise the RF sub-carrier channel as previous discussed. The dual channel receiver of FIG. 5 provides aerosol rejection by amplitude comparison of the signal returned in the baseband and the RF channels.

In operation, the reply pulse information generates a control signal at the output of Doppler filter 40 as previously described. In addition, DC average power of the amplified detected pulse information from preamplifier 30 is envelope detected and filtered by the baseband channel for providing a DC control signal at the output of filter 92. Comparator 94 is biased such that it is rendered operative to pass a gating signal to one input of AND gate 96 only when the control signal, which is applied to one input of comparator 94, has a magnitude greater than the magnitude of the DC control signal from filter 92, which is applied to other input terminal of comparator 94. Thus, a gating signal is applied to AND gate only at times that a real target has been detected due to the magnitude of the RF energy of the Doppler frequency signal being greater than the magnitude DC average energy, as previously discussed. Threshold detector 42 being responsive to the magnitude of the control signal from Doppler filter 40 generates a second gating signal to AND gate 96. Hence, in response to a real and target (hard or dull) being detected, AND gate 96 is gated open and a threshold signal is generated at output terminal 44.

As previously described, the signal at output terminal 46 can be utilized to provide target velocity information for a tracking radar system.

Figure 6:
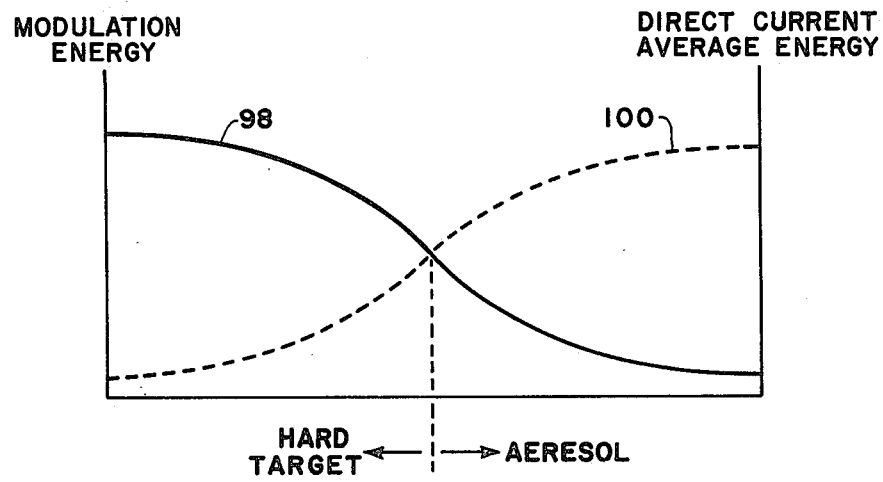
FIG. 6 is a waveform diagram of modulation power versus average direct current power useful for illustrating the operation of the preferred embodiment of the invention of FIG. 5.

FIG. 6 illustrates typical curves for RF modulation energy versus the direct current average energy contained in the reply pulses from a target. As shown, if the ratio of the RF modulated energy is greater than the average DC energy of the return pulse it is assumed that a hard target is being detected. However, if the ratio of direct current average energy becomes substantially equal to or greater than a predetermined ratio of the RF modulated energy being detected then it can be assumed that the target is an aerosol. By varying the relative gains of the inputs to comparator 94, it is possible to vary the crossover point between waveform 98 annd 100 to ensure that the threshold signal from the output of AND gate 96 will occur only in response to a hard target.

What has been described, therefore, is an improved optical sensor for use in a missile or a free fall munition fuze or the like in which light pulses are coherently modulated and demodulated for ensuring detection of real targets versus aerosol targets. The coherent modulated optical sensor of the embodiment of the invention provides aerosol discrimination which has been lacking in heretobefore prior art circuits. Aerosol discrimination is provided to prevent prefunctioning of a missile or bomb fuze due to the pulse stretching effects generated by an aerosol.

It is contemplated after having read the description of the preferred embodiments, those skilled in the art may foresee certain alterations and modifications which have not been pointed out with particularity herein.

Accordingly, this disclosure is intended to be in the nature of an explanatory illustration only and is in no way to be considered as limiting. Therefore, the appended claims are to be interpreted as covering all modifications which fall within the true spirit and scope of the invention.

What is claimed is:

1. A transceiver for detecting a selected target having relative motion thereto, comprising:
   transmitter means for generating and transmitting a sequence of radio frequency (RF), intensity modulated optical pulses including:
   (a) means for generating an RF signal;
   (b) switching means for generating a gating control signal having a predetermined pulse repetition frequency (PRF);
   (c) amplifier means responsive to said RF signal and said gating control signal for generating amplified pulses of said RF signal at said pulse repetition rate;
   (d) means for generating optical energy;
   (e) modulating means responsive to said RF amplifier pulses for intensity modulating said optical energy; and
   receiver means for detecting and processing said RF intensity modulated pulses returned from the target to provide threshold signal information, said receiver means including first and second channel means for deriving, respectively, a threshold control signal from the Doppler frequency signal induced on said returned RF modulated pulses and base band signal information from said returned pulses and circuit means for comparing said baseband signal to said threshold control signal to provide said threshold signal information when said threshold control signal is of a predetermined relationship to said baseband signal.

2. The transceiver of claim 1 wherein:
   said means for generating an RF signal includes a continuous running oscillator; and
   said means for generating optical energy is a laser diode.

3. The transceiver of claim 2 wherein said laser diode is a gallium arsenid diode.

4. The transceiver of claim 1 wherein said receiving means, includes in combination:
   detector means tuned to said RF frequency for detecting said intensity modulated pulses returned by the target;
   amplifier means for amplifying said detected intensity modulated pulses, said amplifier means being coupled to said second channel means;
   down-converting means responsive to said amplifier means and said means for generating an RF signal for deriving an output signal, the envelope of said output signal being said Doppler frequency, said down converting means being coupled to said first channel means; and
   said first channel means including means for detecting said envelope of said Doppler frequency to provide said threshold control signal.

5. The transceiver of claim 4 wherein said means for detecting said envelope of said Doppler frequency includes:
   constant false alarm receiver means for providing an output signal at said Doppler frequency and for repressing any output signal which might be generated by random noise in the absence of said Doppler frequency; and
   threshold detecting means responsive only to the amplitude of said output signal from said constant false alarm receiver means being substantially equal to or greater than a predetermined value for developing said threshold control signal.

6. The transceiver of claim 2 wherein said receiving means comprises:
   detector means tuned to said RF frequency for detecting said RF intensity modulated pulses returned by the target;
   amplifier means for amplifying said detected intensity modulated pulse;
   down-converting means for deriving an output signal which is representative of the envelope of said Doppler frequency signal in response to the presence of said amplified RF intensity modulated pulses and said RF signal from said continuous running oscillator means;
   means for detecting said envelope of said Doppler frequency signal to provide said threshold control signal;
   said baseband signal having a magnitude which is proportional to the average direct current energy comprising said RF frequency from said amplifying means;
   comparator means receiving said threshold control signal and said baseband signal for comparing the amplitude of said threshold control signal and said baseband signal for providing a gating signal at an output thereof in response to said control signal being substantially equal to or greater than said baseband signal; and
   gating means responsive to said gating signal from said comparator means and said threshold control signal from said means for detecting said envelope of said Doppler frequency signal for providing said threshold signal information at an output terminal thereof.

7. The transceiver of claim 6, wherein said means for detecting a baseband signal includes:
   envelope detector means having an input terminal connected to the output of said amplifying means and an output terminal; and
   a low pass filter having an input terminal and an output terminal, said input terminal being connected to said output terminal of said envelope detector means and said output terminal being connected to said comparator means.

8. The transceiver of claim 5 wherein:
   (a) said second channel means includes:
      (1) envelope detecting means for providing an output signal having a magnitude which is proportional to the average direct current power comprising said RF frequency from said amplifying means;
      (2) filter means for providing said baseband signal at an output terminal thereof, said baseband signal having a magnitude proportional to said direct current average power applied from said envelope detecting means;
   (b) said circuit means includes:
      (1) comparator means receiving said baseband signal from said filter means and said threshold control signal from said threshold detecting means for providing a gating control signal in response to the magnitude of said threshold control signal from said detecting means being substantially equal to or greater than the magnitude of said control signal from said filter means; and (2) gating means receiving said gating control signal from said comparator means and said threshold control signal from said threshold detecting means for providing said threshold signal information.

9. A transceiver for transmitting and receiving radio frequency, intensity modulated optical pulses which is suitable for being provided in a missile or the like for detecting the presence of a target having relative motion thereto for activating the fuzing system of the missile or the like, comprising:

oscillator means for generating a radio frequency (RF) reference signal having a predetermined frequency;

switching means for generating a switching signal having a predetermined pulse width and pulse repetition frequency (PRF);

first amplifier means being responsive to said RF reference signal and said switching signal for generating a sequence of pulses at said predetermined pulse repetition frequency and at the frequency of said RF reference signal;

means for generating energy at a predetermined optical frequency;

modulating means responsive to said RF pulses from said first amplifier means for intensity modulating, at an RF subcarrier rate, said means for generating optical energy to provide a sequence of transmitted pulses of optical energy;

photo detecting means for receiving said sequence of transmitted pulses returned from the target and for providing a signal at substantially said RF subcarrier frequency;

second amplifier means for amplifying said signal at said RF subcarrier frequency;

down-converting means for generating the envelope of a Doppler frequency signal induced on said RF subcarrier in the presence of said RF reference signal, the instantaneous phase of said signal information at said RF subcarrier frequency being related to the instantaneous phase of said RF frequency reference signal;

first channel means responsive to said envelope of said Doppler frequency signal for providing a threshold control signal;

second channel means coupled to said second amplifier means and being responsive to said RF subcarrier frequency for providing a baseband signal; and circuit means responsive to said baseband signal and said threshold control signal for producing a threshold signal suitable to activate the fuzing system where said baseband and threshold control signals are of a predetermined relationship to one another.

10. The transceiver of claim 9 wherein said first channel means includes;

sampling means receiving said envelope of said Doppler frequency signal from said down converting means for providing an output signal which is related to said envelope of said Doppler frequency signal;

means for detecting said output signal from said sampling means in the presence of noise to provide an output signal substantially at said Doppler frequency and for repressing any output signal which is generated by random noise in the absence of said Doppler frequency; said output signal being suitable to render target velocity information; and threshold detecting means responsive to the amplitude of said output signal of said enhancing means being greater than a predetermined magnitude for generating said threshold control signal in response to the target being detected.

11. The transceiver of claim 10 wherein:

(a) said second channel means includes:

(1) envelope detecting means receiving RF signal from said second amplifier means for providing an output signal proportional to the direct current average power contained in said RF signal from said amplifying means at an output terminal thereof;

(2) filter means responsive to said output signal from said envelope detecting means for providing said baseband signal at an output terminal thereof, said baseband signal having an amplitude which is proportional to the direct current average power of said RF signal from said envelope detecting means; and (b) said circuit means includes:

(1) comparator means receiving said threshold control signal and said baseband signal for providing a gating signal at an output terminal thereof in response to said threshold control signal having a magnitude equal to or greater than the magnitude of said baseband signal; and (2) gating means for providing said threshold signal at the output of the transceiver in response to receiving said gating control signal from said comparator means and said threshold control signal from said threshold detecting means.

12. An optical transceiver for detecting a target, comprising:

transmitter means for generating and transmitting radio frequency (RF) subcarrier intensity modulated optical pulses including local oscillator means for generating an RF output signal, gating means responsive to said local oscillator means for producing output pulses of said RF output signals at a predetermined pulse repetition frequency (PRF), means for producing optical energy, modulator means responsive to said RF pulses from said gating means for intensity modulating said optical energy at a subcarrier frequency and repetition rate of said RF pulses; and receiver means receiving said modulated optical pulses returned by the target for processing said pulses to provide an output threshold signal, said receiver means including first and second channel means for deriving first and second output signals having amplitudes indicative of the direct current (DC) and alternating current (AC) components of the RF modulated pulses respectively, and circuit means responsive to said first and second output signals for providing said output threshold signal only when said second output signal is of a predetermined relationship to said first output signal.

13. The transceiver of claim 12 wherein said receiver means includes:

first detector means responsive to said returned RF modulated pulses for producing an output signal at essentially said RF subcarrier signal;

amplifier means for amplifying said RF subcarrier signal;

down-converter means responsive to said RF subcarrier signal and said RF output signal from said local oscillator means for producing an output signal at the Doppler frequency induced on said RF subcarrier signal of said returned RF modulated pulses;

said second channel means being responsive to said Doppler frequency output signal for producing said second output signal; and said first channel means being responsive to said RF subcarrier signal for producing said first output signal.

14. The transceiver of claim 13 wherein:

(a) said first channel means includes;
  (1) second detector means for providing a detected output signal indicative of the envelope of said RF subcarrier signal;
  (2) filter means for producing said first output signal in response to said detected output signal;
(b) said second channel means includes;
  (1) constant false alarm receiver means for generating a threshold signal in response to said Doppler frequency signal; and
  (2) threshold detector for producing said second output signal in response to said threshold signal.

* * * * *